United States Patent [19]

Braud

[11] Patent Number: 4,949,782
[45] Date of Patent: Aug. 21, 1990

[54] AIR HEATER FOR CORROSIVE ATMOSPHERES

[75] Inventor: Yves Braud, Maurepas, France

[73] Assignee: Stein Heurtey, Evry Cedex, France

[21] Appl. No.: 328,291

[22] Filed: Mar. 24, 1989

[30] Foreign Application Priority Data

Apr. 5, 1988 [FR] France ................................. 88 04445

[51] Int. Cl.⁵ ............................................. F28F 19/00
[52] U.S. Cl. ......................................... 165/34; 165/35; 165/39; 165/134.1; 165/921
[58] Field of Search ..................... 165/134.1, 921, 34, 165/35, 39; 122/DIG. 1, DIG. 2

[56] References Cited

U.S. PATENT DOCUMENTS

| | | | |
|---|---|---|---|
| 2,947,522 | 8/1960 | Keller | 165/134.1 |
| 3,233,664 | 2/1966 | Jacobs | 165/921 |
| 4,243,096 | 1/1981 | Lipets et al. | 165/921 |
| 4,305,455 | 12/1981 | Lipets et al. | 165/921 |
| 4,483,391 | 11/1984 | Gilbert | 165/921 |
| 4,576,226 | 3/1986 | Lipets et al. | 165/134.1 |

FOREIGN PATENT DOCUMENTS

| | | | |
|---|---|---|---|
| 2454598 | 11/1980 | France . | |
| 2545197 | 11/1984 | France . | |
| 565151 | 7/1977 | U.S.S.R. | 165/921 |
| 0848892 | 7/1981 | U.S.S.R. | 165/921 |
| 1090978 | 5/1984 | U.S.S.R. | 165/134.1 |

Primary Examiner—John Ford
Attorney, Agent, or Firm—Sandler, Greenblum & Bernstein

[57] ABSTRACT

Air heater resisting corrosion, using combustion products from thermal equipment, the combustion products containing polluting and corrosive agents such as sulfur oxidized components and sodium and vanadium salts, the air heater including at least one tube nest through which flows the air to be heated, which is placed in the path of travel of the corrosive fumes prior to their discharge to the atmosphere, the corrosive fumes flowing countercurrent to the air to be heated and flowing through the tubes, this heater further comprising a protective tubular nest placed upstream of the tube nest, this protective nest being fed with a constant flow of cold air circulating in the same direction as the fumes, this cold air flow and the exchange surface of the protective nest being chosen in such manner that the temperature of the first tubes of the heater tubular nest is at all times below the sodium and vanadium corrosion critical temperature. The constant air flow exiting from the protective nest is thereafter redistributed at the inlet or at the outlet of the heater tubular nest, as a function of the operation conditions, so that the temperature of the skin of the tubes of this tubular nest is always slightly above the acid dew point temperature of the fumes.

7 Claims, 1 Drawing Sheet

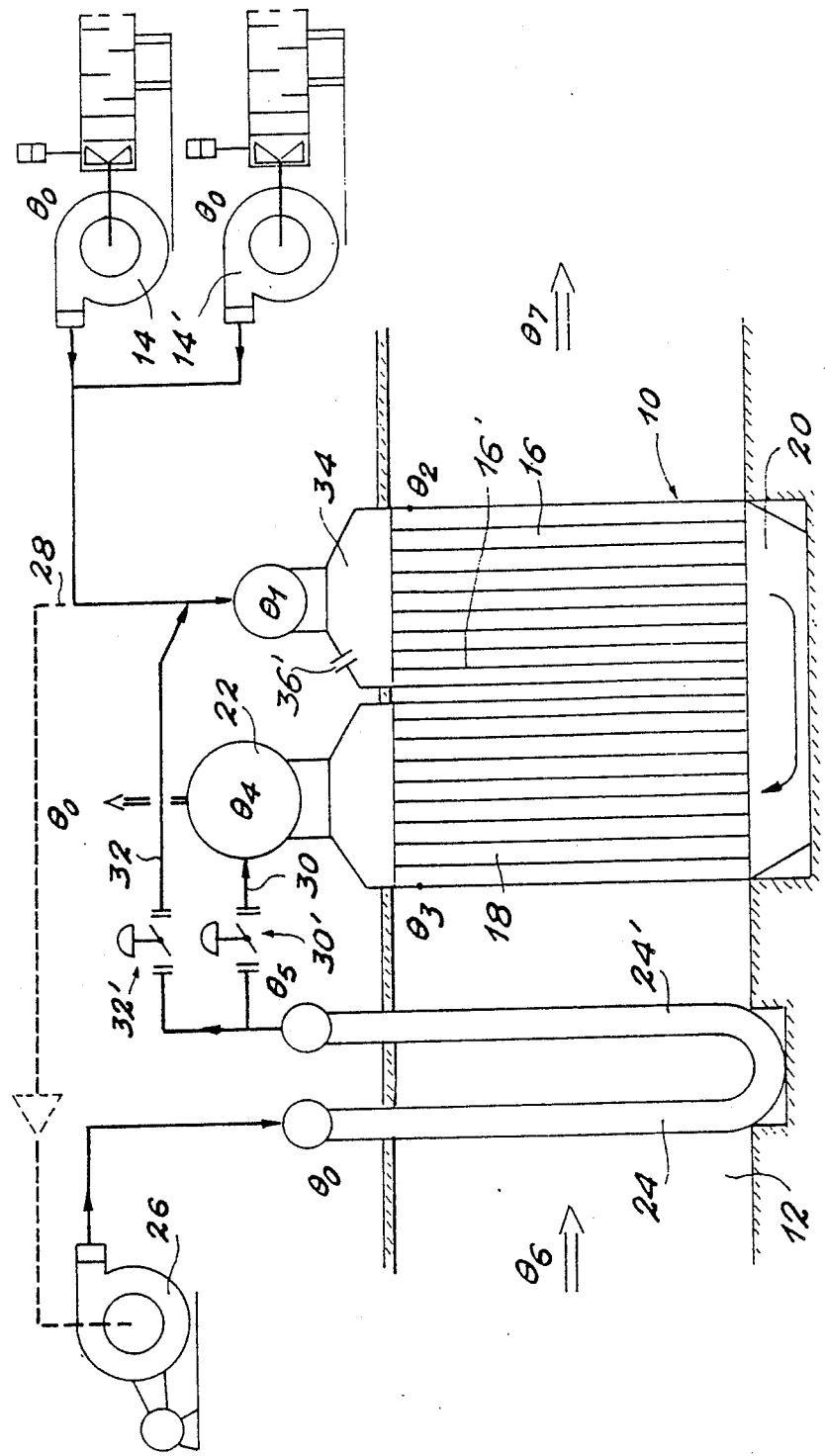

AIR HEATER FOR CORROSIVE ATMOSPHERES

FIELD OF THE INVENTION

The present invention relates to an air heater for boilers, ovens and other similar thermal equipment, in which the products of the hot and corrosive combustion are used for heating cold air.

It is known that the use in such thermal equipment of fossile fuels, particularly liquid, generates fumes which include more or less large quantities of polluting and corrosive agents, notably sulfur oxidized components and sodium and vanadium salts. The result is that air heaters formed of nests of tubes placed in the path of travel of the corrosive combustion gases prior to their discharge in the atmosphere are subjected to corrosion hazards at high temperatures due to the sodium/vanadium salts, and to corrosion hazards at low temperatures due to the acid condensations caused by the presence of sulfur oxides.

BACKGROUND OF THE INVENTION

Air heaters with tubular nests resisting the corrosion caused by the condensation of the fume acid vapours are known (see notably FR-A-2,454,598-2,545,197), in which the incoming air is subjected in the first tubes of the nest to a preheating at a high temperature, in such manner that the temperature of the tubes is maintained at a value which is higher than that of the acid dew point of the fumes. However, these known solutions do not prevent corrosion caused by the sodium and vanadium salts since preheating the air flowing in the first tubes of the tubular nest subjected to the action of the corrosive fumes maintains these first tubes at a temperature which is above the corrosion critical temperature of sodium/vanadium.

One will understand that in order to avoid, or at least reduce, simultaneously the corrosion hazards due to the sulfur oxidized components and the sodium and vanadium salts, it is imperative to maintain the skin of the heater tubes in contact with the fumes, on the one hand at a temperature which is below the corrosion critical temperature of sodium/vanadium, and on the other hand at a temperature which is above the acid dew point of the fumes.

In an attempt to solve this problem, air heaters with tubular nests are provided including a nest made of corrosion resisting tubes and fed with air at a temperature and at a flow rate such that the temperature of the skin of these tubes remains below the corrosion critical temperature of the sodium and vanadium salts. On the other hand, in order to reduce the corrosion hazards due to the acid condensations caused by the sulfur oxides, the final passes, in the direction of the flow of the fumes, can be effected in a cocurrent way (meaning that the two fluids: fumes and air to be heated, flow in the same direction), thereby avoiding a too low temperature on the tube skins.

According to this solution, one will understand that the design of the air heaters is fixed from the very start and that it is not possible to thereafter adapt the design to the various operating conditions usually encountered in the equipment mounted upstream. This fixed design is therefore a major disadvantage since it not only causes possible throughout drops but it does not allow total supression of corrosion hazards in the extreme cases of maximum and minimum operation.

OBJECTS AND SUMMARY OF THE INVENTION

An object of present invention is therefore to mitigate the disadvantages of the hereabove described prior art solutions by providing an air heater which includes means allowing controlling permanently the temperature of the tubular nest tubes which are most subjected to corrosion hazards.

Consequently, the invention relates an air heater resisting to corrosion, using combustion products from thermal equipment containing polluting and corrosive agents such as sulfur oxidized components and sodium and vanadium salts, which includes at least one tube nest through which flows the air to be heated, which are placed in the path of travel of the corrosive fumes, prior to their discharge in the atmosphere, said corrosive fumes flowing countercurrent to the air to be heated and flowing through the tubes, the heater includes a protective tubular nest, placed upstream of said tube nest, this protective nest being fed with a constant flow of cold air circulating in the same direction as the fumes. The cold air flow and the exchange surface of said protective nest are chosen in such manner that the temperature of the first tubes of the heater tubular nest is at all times below the sodium and vanadium corrosion critical temperature, and the constant air flow exiting from said protective nest is thereafter redistributed at the inlet or at the outlet of the heater tubular nest, as a function of the operating conditions, so that the temperature of the skin of the tubes of this tubular nest is always slightly above the acid dew point temperature of the fumes.

BRIEF DESCRIPTION OF DRAWING

Other features and advantages of the present invention will become more apparent from the following description made with reference to the accompanying drawing, the single FIGURE of which being a schematic view showing a non-limiting embodiment of the air heater according to the invention.

DETAILED DESCRIPTION OF THE INVENTION

With reference to the drawing, one sees that in this embodiment, the air heater designated as a whole by reference 10 includes two tubular nests 16, 18 of countercurrent type, meaning that the air to be heated flows in their tubes countercurrent to the corrosive combustion gases forming the heat-conveyor means. These tubular nests 16, 18 are placed in the flue 12 where the corrosive combustion products flow, perpendicularly to the tubes of nests 16, 18.

The tubular nests 16, 18 are fed with air at a temperature $\theta_0$ via one or several ventilators such as 14, 14', the air flowing from the first nest 16 to the second nest 18 by passing through a lower distribution box 20, prior to being discharged in the heat installation oven (not shown) via a collector 22.

According to the invention, there is placed in flue 12, upstream of the tubular nests 16, 18 of heater 10, a protective nest made here of two tubes 24, 24', fed with air at a temperature $\theta_0$ via a ventilator 26. This ventilator 26 can either suck the air directly from the atmosphere or be placed in a bypass (line 28 shown in dashed lines) on the heater 10 circuit fed by ventilators 14, 14'. The delivery pressure of ventilator 26 is clearly superior to the pressure prevailing at the inlet of heater 10.

Due to the small relative flow rate of protective nest 24, 24', a loss of charge can occur, consequently causing a speed higher than the usual speed so as to favour the tubes/air exchanges and to better set the skin temperature of the nest tubes of heater 10 which are more exposed to the hot fumes, by setting a notable preference in the convective air/tubes exchange with respect to the tubes/fumes exchange.

As may be seen in the figure, protective nest 24, 24' is placed upstream of the last zone of countercurrent heater 10, that is in front of the first tubes of nest 18 of this heater, and is calculated as regards flow rate and surface to reduce the temperature of the fumes so that during the maximum operation conditions of the heat equipment situated upstream (not shown in the figure), the temperature $\theta_3$ of the first heater tubes of nest 18 is always below the corrosion critical temperature of sodium and vanadium, this critical temperature being a function of the metallurgical quality of the tubes and of the composition of the fumes.

Under normal operating conditions, the hot air exits from protective nest 24, 24' at a temperature $\theta_5$ and is directed toward collector 22 through duct 30 on which is mounted a valve 30' which thereafter feeds an oven, the heater operating with an optimum throughput.

When the thermal equipment situated upstream of the heater is operating at a low speed, to a constant exchange surface corresponds to a lowering of the fumes temperature, which is such that the temperature $\theta_2$ of the last tube of heater nest 16 runs the risk of falling below the acid dew point temperature, which would subject the tubes of heater 10 to a corrosion hazard by the condensation of the sulfur oxidized components contained in the fumes, this being what the invention aims precisely to avoid. Consequently, the hot air flow is deflected in totality or in part at temperature $\theta_5$ from protective nest 24, 24' to the downstream zone of collector 34, bringing the cold air at temperature $\theta_0$ to heater 10. According to the invention, there is therefore provided a bypass duct 32, and a regulation valve 32' for bringing the hot air at temperature $\theta_5$ to collector 34. Thus, air delivered to tubular nest 16 of heater 10 is heated at the temperature $\theta_1 > \theta_0$, said temperature $\theta_1$ being such that the temperature $\theta_2$ of the skin of the tubes of heater 10 is always above the acid dew point temperature of the fumes.

Taking in account the dynamic pressure available in circuit 32, it is possible to give preference to the last layer or layers of tubes of heater 10 by making collector 34 in such manner that it includes nozzles 36' facing the last layers 16' of the tubes of nest 16 of the heater fed by collector 34.

The pressure difference between duct 32 and the delivery pressure of ventilators 14, 14' is reflected by an impulse of air jets, incoming from collector 34, sufficient to force this air through the aforementioned tubes of heater 10. It is possible to obtain a similar effect by subdividing the inlet collector 34 of heater 10 into two or more subcollectors, corresponding to the last layers of tubes 16' being then fed in a preferential manner by duct 32 as a function of the respective temperatures $\theta_2$ at the inlet of heater 10, and $\theta_7$ which is the discharge temperature in the atmosphere of the fumes which have flowed through the heater.

From the preceding description, one will understand that the invention allows:

on the one hand providing a temperature $\theta_1$ for all operation conditions such that the skin temperature $\theta_2$ of the tubes of nest 16 of heater 10 is always slightly above the acid dew point temperature of the fumes, and on the other hand maintaining the temperature $\theta_3$ of the first layers of tubes of nest 18 of heater 10 at a value which is always below the corrosion critical temperature of sodium/vanadium.

The invention therefore provides an air heater eliminating the corrosion hazards at high temperatures of the sodium/vanadium salts and at temperatures below the acid condensations due to the presence of sulfur oxidized components in the fumes.

Of course, the present invention is not limited to the embodiments hereabove described and it encompasses all the variants thereof.

What I claim is:

1. An air heater resisting corrosion, using combustion products from thermal equipment, said combustion products being corrosive fumes containing polluting and corrosive agents such as sulfur oxidized components and sodium and vanadium salts, said air heater including at least one heater tubular nest through which flows the air to be heated, which is placed in the path of travel of the corrosive fumes prior to their discharge to the atmosphere, said corrosive fumes flowing countercurrent to the air to be heated and flowing through the tubes, said air heater further comprising a protective tubular nest placed upstream of said heater tubular nest, this protective nest being fed with a constant flow of cold air circulating in the same direction as the fumes, this cold air flow and the exchange surface of said protective nest being chosen in such manner that the temperature of the first tubes of the heater tubular nest is at all times below the sodium and vanadium corrosion critical temperature, and means are provided wherein the constant air flow exiting from said protective nest is thereafter redistributed at the inlet or at the outlet of the heater tubular nest, as a function of the operating conditions, so that the temperature of the skin of the tubes of the heater tubular nest is always slightly above the acid dew point temperature of the fumes.

2. An air heater according to claim 1, wherein the protective nest is fed with air at a pressure which is superior to the pressure prevailing at the inlet of the tubular nest of said heater.

3. An air heater according to claim 1, wherein said protective nest is fed with air by a ventilator sucking the air.

4. An air heater according to claim 1, wherein the protective nest is fed by a ventilator sucking air directly from the atmosphere.

5. An air heater according to claim 1, wherein the protective nest is fed by a ventilator sucking the air from a by-pass duct on a feeding circuit of the heater.

6. An air heater according to claim 1, wherein as a function of the desired operating condition, the hot air incoming from the protective nest is either sent back to a hot air collector for feeding an oven, the whole heater operating with an optimum output, or bypassed, in totality or in part, toward a downstream zone of a cold air inlet collector in the heater.

7. An air heater according to claim 4, wherein a collector feeding the heater with cold air is provided with nozzles facing the last layers of the heater tubes which are fed by this collector.

* * * * *